US008625456B1

(12) United States Patent
Boden, Jr. et al.

(10) Patent No.: US 8,625,456 B1
(45) Date of Patent: Jan. 7, 2014

(54) WITHHOLDING A DATA PACKET FROM A SWITCH PORT DESPITE ITS DESTINATION ADDRESS

(75) Inventors: Peter Nils Boden, Jr., Veradale, WA (US); Dackary Ronald Busch, Veradale, WA (US); Michael J. Chartier, Liberty Lake, WA (US)

(73) Assignee: World Wide Packets, Inc., Spokane, WA (US)

( * ) Notice: Subject to any disclaimer, the term of this patent is extended or adjusted under 35 U.S.C. 154(b) by 1542 days.

(21) Appl. No.: 11/533,904

(22) Filed: Sep. 21, 2006

(51) Int. Cl.
*H04L 12/28* (2006.01)
*H04L 12/56* (2011.01)
*G06F 15/177* (2006.01)
*G06F 15/173* (2006.01)

(52) U.S. Cl.
USPC ...... 370/254; 370/390; 370/395.54; 709/222; 709/226

(58) Field of Classification Search
USPC ............... 370/254, 389–390, 395.52–395.54, 370/475; 709/220–22, 226, 236, 245
See application file for complete search history.

(56) References Cited

U.S. PATENT DOCUMENTS

| 6,697,360 | B1 | | 2/2004 | Gai et al. | |
|---|---|---|---|---|---|
| 7,209,435 | B1 | * | 4/2007 | Kuo et al. | 370/219 |
| 7,231,660 | B1 | | 6/2007 | Daude et al. | |
| 7,783,735 | B1 | * | 8/2010 | Sebes et al. | 709/223 |
| 2004/0151120 | A1 | * | 8/2004 | Shankar et al. | 370/249 |
| 2004/0221042 | A1 | * | 11/2004 | Meier | 709/227 |
| 2005/0114544 | A1 | | 5/2005 | Chu et al. | |
| 2005/0246768 | A1 | * | 11/2005 | Hunt et al. | 726/11 |
| 2006/0036733 | A1 | * | 2/2006 | Fujimoto et al. | 709/225 |
| 2006/0064506 | A1 | * | 3/2006 | Mielke | 709/244 |
| 2006/0155853 | A1 | * | 7/2006 | Nesz et al. | 709/227 |
| 2006/0212560 | A1 | | 9/2006 | Purser | |
| 2006/0248229 | A1 | | 11/2006 | Saunderson et al. | |
| 2007/0076607 | A1 | * | 4/2007 | Voit et al. | 370/230 |

OTHER PUBLICATIONS

Droms, R., "RFC 2131—Dynamic Host Configuration Protocol" Mar. 1997, Bucknell University, pp. 1-45.
U.S. Appl. No. 11/533,874, filed Sep. 21, 2006, inventor: Peter Nils Boden Jr., et al.
Patrick, M., "DHCP Relay Agent Information Option", Motorola BCS, Jan. 2001, 14 pages.

* cited by examiner

*Primary Examiner* — Un C Cho
*Assistant Examiner* — Jeremy Costin
(74) *Attorney, Agent, or Firm* — Clements Bernard PLLC; Christopher L. Bernard; Lawrence A. Baratta, Jr.

(57) ABSTRACT

This document describes tools that withhold a data packet from a switch port despite its destination address. In one embodiment, the tools may receive a port description identifying a set of switch ports. The tools configure the set of ports so that data packets exchanged through the switch by interested entities that would otherwise be forwarded to uninterested entities are instead withheld from the uninterested entities. In another embodiment, the tools may configure a data-packet switch according to a port description identifying a set of ports and a subset of the set of ports. The tools receive a data packet that includes a broadcast destination address on a receive port and then determine, based on the port description, whether the receive port belongs to the subset. If the receive port does not belong to the subset the data packet is withheld from the other ports of the set.

13 Claims, 14 Drawing Sheets

WITHHOLDING A DATA PACKET FROM A SWITCH PORT DESPITE ITS DESTINATION ADDRESS

BACKGROUND

An important component of a data network is an addressing scheme that allows devices connected to the network to communicate with each other. A common protocol used to assign network addresses in Internet Protocol (IP) networks is the Dynamic Host Configuration Protocol (DHCP). Typically, a device uses a DHCP client to obtain a network address by exchanging DHCP messages with a DHCP server.

As the number of devices connected to a data network increases, so does the number of DHCP messages. Because many of these messages are broadcast, they may be sent to every device on a network, not just the DHCP client attempting to obtain a network address and the DHCP server. Consequently, a large number of broadcast messages may needlessly consume network resources.

Security problems may also arise due to broadcast DHCP messages. For example, a rogue DHCP server may intercept a request for an address sent by a DHCP client and improperly reply to the request. As a result, the rogue server may disable the client by assigning it a non-functional network address. Malevolent devices may also be listening to broadcast DHCP messages to discover which network address is assigned to a device and later use its knowledge of the network address in a harmful way.

A conventional solution to these problems is to limit the number of broadcast messages allowed on a network link. A limit may reduce the amount of link bandwidth consumed by broadcast messages, but has the undesirable side effect of unintentionally discarding legitimate DHCP messages. Furthermore, a limit does not address the security problems described above.

SUMMARY

This document describes tools that withhold a data packet from a switch port despite its destination address. In one embodiment, the tools may receive a port description identifying a set of switch ports. The tools configure the set of ports so that data packets exchanged through the switch by interested entities that would otherwise be forwarded to uninterested entities are instead withheld from the uninterested entities. In another embodiment, the tools may configure a data-packet switch according to a port description identifying a set of ports and a subset of the set of ports. The tools receive a data packet that includes a broadcast destination address on a receive port and then determine, based on the port description, whether the receive port belongs to the subset. If the receive port does not belong to the subset the data packet is withheld from the other ports of the set.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "tools," for instance, may refer to system(s), method(s), computer-readable instructions, and/or technique(s) as permitted by the context above and throughout the document.

BRIEF DESCRIPTION OF THE DRAWINGS

The same numbers are used throughout the disclosure and figures to reference like components and features.

DETAILED DESCRIPTION

Overview

The following document describes tools capable of withholding a data packet from a switch port despite its destination address. An environment in which the tools may enable these and other actions is set forth below in a section entitled Exemplary Operating Environment. This is followed by another section describing exemplary ways in which the tools may act to forward data packets to some ports within a set of ports and prevent data packets from being forwarded to other ports within the set and is entitled Exemplary Embodiments for Withholding a Data Packet from a Switch Port Despite Its Destination Address. A final section describes these and other embodiments and manners in which the tools may act and is entitled Other Embodiments of the Tools. This overview, including these section titles and summaries, is provided for the reader's convenience and is not intended to limit the scope of the claims or the entitled sections.

Exemplary Operating Environment

Before describing the tools in detail, the following discussion of an exemplary operating environment is provided to assist the reader in understanding some ways in which various inventive aspects of the tools may be employed. The environment described below constitutes an example and is not intended to limit application of the tools to any one particular operating environment. Other environments may be used without departing from the spirit and scope of the claimed subject matter.

Figure 1:
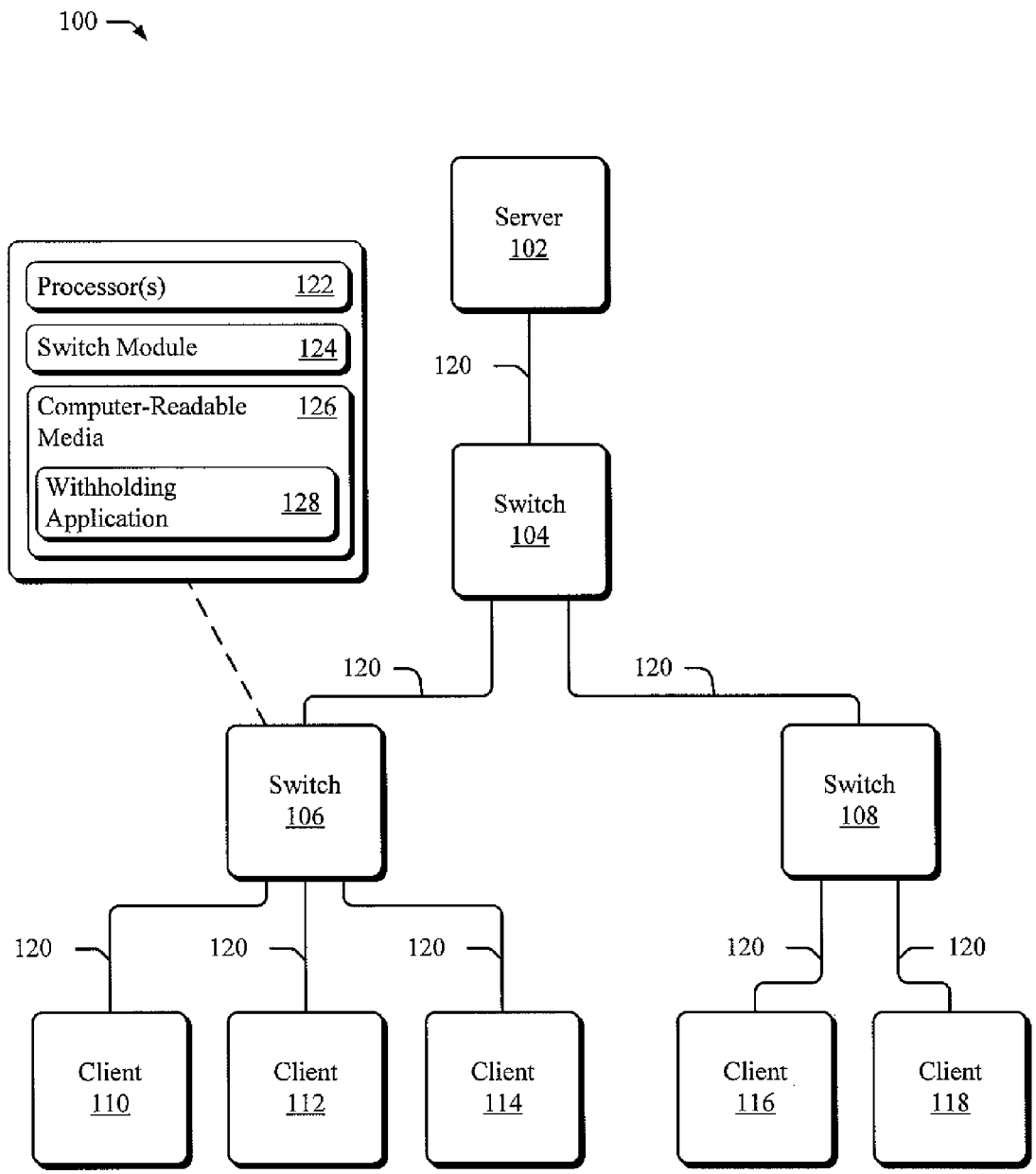
FIG. 1 illustrates an exemplary operating environment in which various embodiments of the tools may operate.

FIG. 1 illustrates one operating environment generally at 100 for enabling equipment to withhold a data packet from a switch port despite its destination address. The environment includes a server 102; three switches 104, 106, 108; and five clients 110, 112, 114, 116, 118.

The server communicates with the clients by exchanging data packets with the clients. A data network connects the server and clients and facilitates the exchange of data packets. In this embodiment of the operating environment, the data network comprises three switches. Of course, the data network may include other devices or may have a different topology than the data network illustrated in FIG. 1 as long as the data network includes at least one switch and is capable of facilitating an exchange of data packets between the server and the clients.

The server may comprise a computer, a server, a personal digital assistant (PDA), a wireless data device, or other device capable of sending and receiving data packets. Similarly, the clients may also comprise a computer, a server, a personal digital assistant (PDA), a wireless data device, or other device capable of sending and receiving data packets.

The clients interact with the server to accomplish a desired result. For example, in one embodiment the clients are DHCP clients that communicate with a DHCP server to acquire an IP address from the DHCP server. The DHCP client uses the IP address on a temporary, permanent, or semi-permanent basis to communicate with other devices connected to the network.

Each switch may be a switch, router, hub, or other device capable of forwarding data packets. Although the switches illustrated in FIG. 1 are each connected to four or fewer devices (a server, switch, or client), the switches may generally be connected to a plurality of devices. Each switch comprises a plurality of ports that transmit and receive data packets. Each switch forwards a data packet received on one port of the switch to a destination port of the switch based on a destination address included in the data packet. The destination port may change from data packet to data packet since the destination address included in each data packet may vary.

Each switch may comprise one or more processor(s) 122, a switch module 124, and computer-readable media 126. The computer-readable media includes a withholding application 128 comprising a set of executable instructions that when executed withhold a data packet from a switch port despite its destination address. The switch module 124 may comprise one or more switch chips capable of forwarding data packets from one switch port to another switch port. The processor(s) are capable of accessing and/or executing the computer-readable media and may be further capable of configuring the switch module to operate in a particular manner. In some embodiments, the switch module may access and/or execute portions of the computer-readable media.

Each switch may alternatively comprise a programmable logic device, such as a Field Programmable Gate Array (FPGA), and the computer-readable media 126. In this embodiment, the FPGA is capable of accessing and/or executing the computer-readable media, including the withholding application and forwarding data packets from one switch port to another switch port.

In yet another alternative embodiment, each switch may comprise a network processor and computer-readable media. In this embodiment, the network processor is capable of accessing and/or executing the computer readable media, including the withholding application and forwarding data packets from one switch port to another switch port.

Switch 104 may be used to aggregate data packets. For example, switch 104 may receive data packets from both switch 106 and switch 108 and forward the data packets on a single link to the server. Using switch 104 to aggregate data packets from several switches may be a more efficient manner of operating a network than if switch 106 and switch 108 were directly connected to the server.

Physical links 120 provide a communication path between two devices, enabling the two devices to exchange data packets. Each physical link comprises a medium. For example, the medium may be twisted-pair copper, single-mode fiber, multi-mode fiber, a radio frequency, or other medium.

Each physical link also comprises a protocol used to communicate over the physical medium. For example, the devices may communicate using Ethernet data packets, Asynchronous Transfer Mode (ATM) cells, Time Division Multiplexing (TDM) messages, or the like. Additionally, each physical link may use higher-level protocols such as Internet Protocol (IP) or Transmission Control Protocol (TCP).

Entire switches or ports of one or more switches may be grouped together into a domain. Clients or servers that are connected to ports belonging to the same domain are able to communicate with each other by exchanging data packets. The switches within the domain relay these data packets between the client and the server. In contrast, devices connected to switch ports belonging to different domains are not able to communicate with each other because switches do not relay data packets between domains. A Local Area Network (LAN) is one example of a domain.

A second example of a domain is a Virtual Local Area Network (VLAN). Devices belonging to a common VLAN may exchange data packets with each other, but devices belonging to different VLANs are not able to exchange data packets with each other. The switches of a data network may be capable of supporting a plurality of VLANs simultaneously and may thereby support a plurality of domains simultaneously.

A switch may support multiple VLANs simultaneously by dividing a single physical switch port into a plurality of logical ports. Each of these logical ports may be assigned to a different VLAN and thus a different domain. Data packets relayed by the physical switch port include a VLAN identifier that enables the switch port to assign each data packet to a particular VLAN.

Another example of a domain is a multicast group. A multicast group enables a multicast server to send a single data packet into a network that the multicast server intends each of a plurality of multicast clients to receive. The data packet comprises a particular multicast destination address. Switches that couple the multicast server to the multicast clients replicate the data packet for each switch port that is connected directly or indirectly through another switch to a multicast client and send the replicates out each of these ports.

Switch ports not connected directly or indirectly to a multicast client do not receive a replicate. In this manner, the switch confines replicates to a particular set of switch ports and multicast clients. This set of switch ports forms a domain and data packets sent by the multicast server are confined to the domain.

FIG. 1 illustrates a single domain wherein the server, switches, and clients are able to communicate with each other.

Each domain may have a method of efficiently distributing a data packet to all devices that are part of the domain. The use of a reserved address as a destination address is one such method. The reserved address indicates that the data packet is addressed to all destinations within a domain instead of to one particular destination. Switches that encounter a data packet having the reserved address as a destination address recognize the reserved address. In response, the switches replicate the data packet and send a replicate to each switch port belonging to the domain.

For example, a reserved Ethernet broadcast address may be used to send a data packet to all devices belonging to a LAN or a VLAN. Alternatively, one of a set of reserved Ethernet multicast address may be used to send data packets to all multicast clients belonging to a domain comprising a multicast group.

Exemplary Embodiments for Withholding a Data Packet from a Switch Port Despite its Destination Address FIGS. 2-8 illustrate exemplary embodiments of the tools enabling switches to withhold a data packet from a switch port despite its destination address. The tools may act in other manners as well, some of which are described in the final section.

Figure 2:
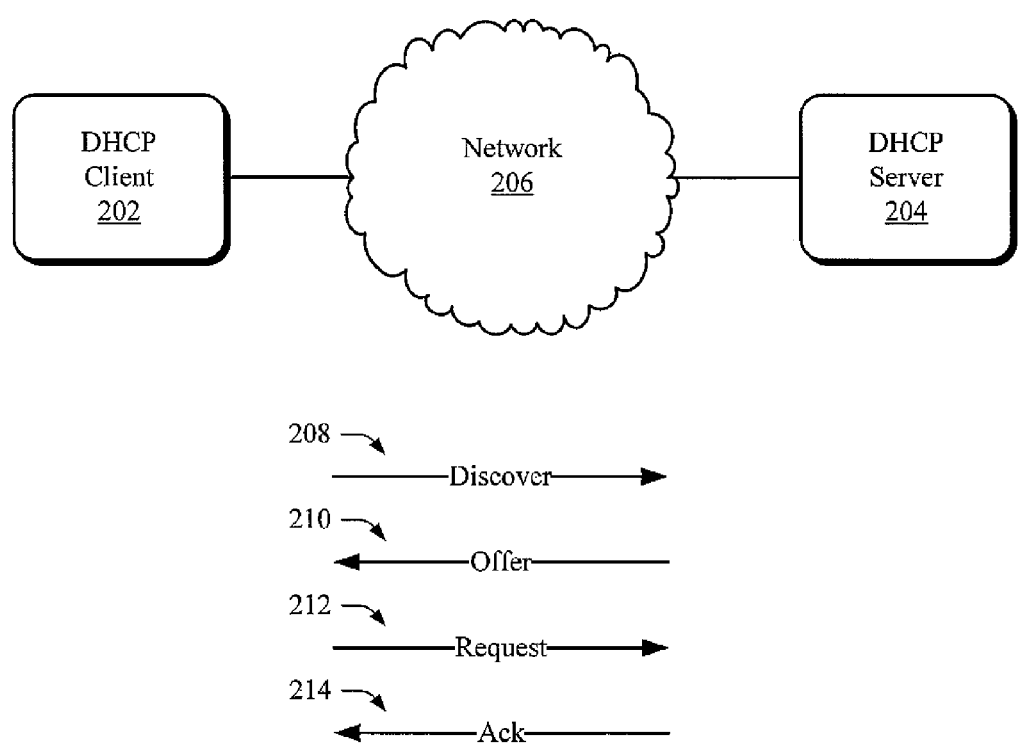
FIG. 2 illustrates an exemplary set of communications between a client and a server.

FIG. 2 illustrates an exemplary set of communications between a DHCP client 202 and a DHCP server 204 used by the DHCP client to obtain a network address. A network 206 couples the DHCP client to the DHCP server. To obtain a network address, the DHCP client sends a DHCP discover message.

The DHCP discover message requests a network address from a DHCP server. The DHCP discover message includes a broadcast destination address that specifies, as described above in relation to FIG. 1, that the DHCP discover message is to be sent to all devices in the domain (LAN or VLAN) to which the DHCP client belongs. The DHCP discover message is broadcasted because the DHCP client does not know the network address of the DHCP server.

In response to the DHCP discover message, the DHCP server sends a DHCP offer message 210. The DHCP offer message contains a network address that the DHCP server offers to the DHCP client. The DHCP offer message also includes a broadcast destination address and therefore is forwarded to all devices in the domain.

Since the DHCP discover message is sent as a broadcast to all devices in the domain, it is possible that there may be a plurality of DHCP servers in the domain and that each of them will send a DHCP offer message in response to the DHCP discover message. In this situation, the DHCP client will select a single DHCP offer to accept.

Accordingly, the DHCP client sends a DHCP request message 212 indicating that the DHCP client would like to use the network address specified by the selected DHCP offer. This DHCP request message includes a broadcast destination address and therefore is forwarded to all devices in the domain.

The DHCP server that sent the selected DHCP offer responds by sending a DHCP acknowledge message 214 acknowledging that the DHCP client has decided to use the offered network address. The DHCP acknowledge message is addressed directly to the DHCP client rather than being broadcast to all devices in the domain.

This method of obtaining a network address may be used by the clients 110, 112, 114, 116, 118 of FIG. 1. For example, client 110 may use this method to obtain a network address from the server 102. Since each of the other clients 112, 114, 116, 118 are in the same domain as client 110, the other clients will receive the broadcasted DHCP discover, DHCP offer, and DHCP request messages. The other clients have no need to receive these messages. Thus, the distribution of the messages to the other clients is an inefficient use of network resources.

Figure 3:
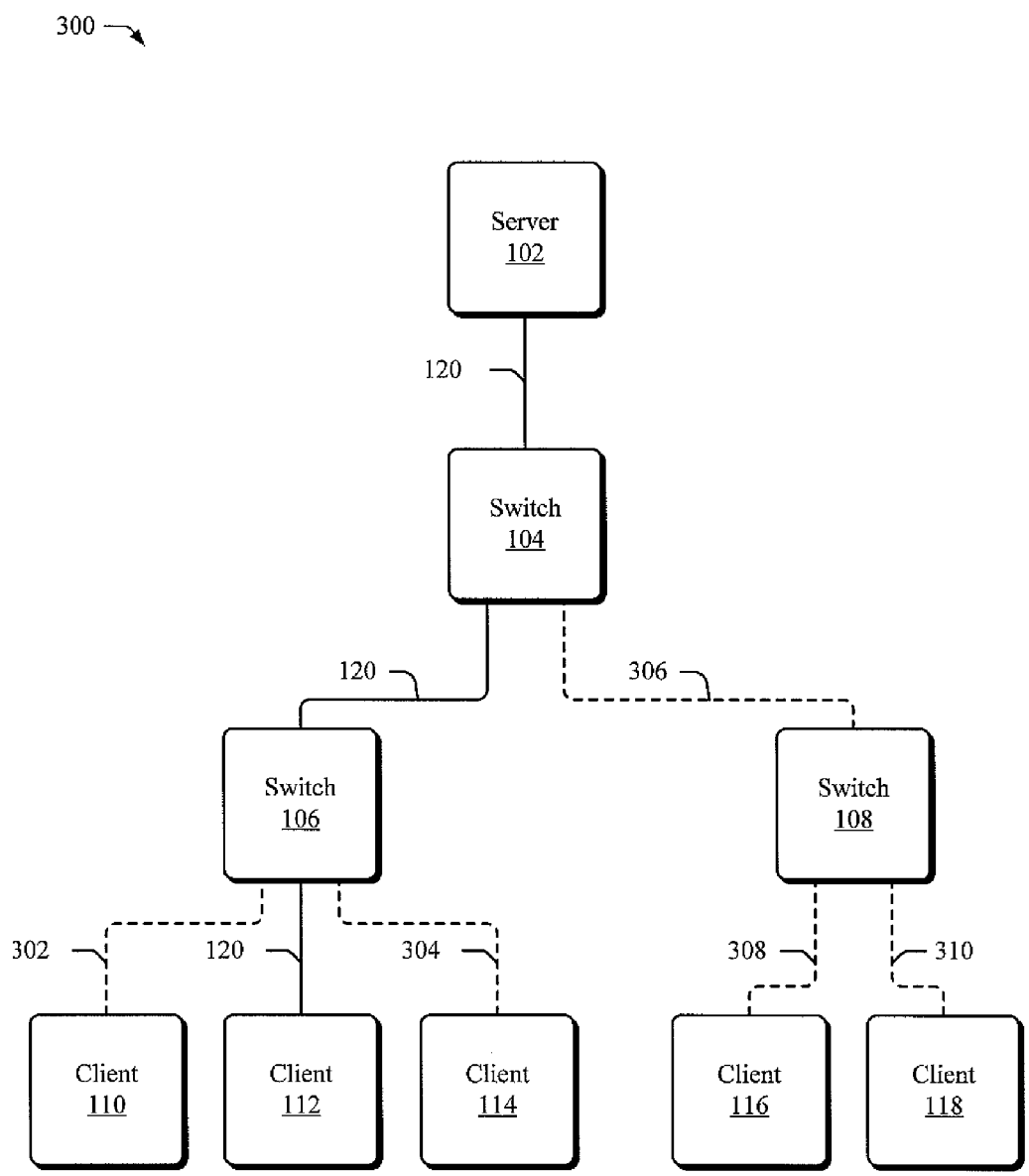
FIG. 3 illustrates an exemplary operating environment in which a data packet is withheld from a port despite its destination address.

FIG. 3 illustrates an exemplary operating environment 300 in which a data packet is withheld from a port despite it destination address. The operating environment is similar to the operating environment of FIG. 1, but illustrates the effect on the environment of a client 112 following the method described above in relation to FIG. 2 to obtain a network address from a server 102.

Client 112 and server 102 exchange broadcast DHCP messages via switch 106 and switch 104. Prior to receiving the broadcast DHCP messages, switch 106 has received a port description identifying a set of ports of the switch that are to be associated with a particular domain. Switch 106 may receive the port description from a management system through a configuration file, a set of SNMP messages, or through another configuration tool well known to those of skill in the art. Alternatively, the port description may be received as part of a firmware or software package that executes on the switch. The port description could also be received through multicast join and/or leave messages.

Switch 106 configures the set of ports, based on the port description, so that the set of ports belong to the domain. Switch 106 also identifies the server 102 and the client 112 as being two parties interested in communicating with each other. Accordingly, switch 106 configures the set of ports so that broadcast DHCP messages exchanged through switch 106 by the server 102 and client 112 are withheld from (i.e. not forwarded to) the uninterested entities connected to switch 106, namely client 110 and client 114. Physical links 302 and 304 are shown as dashed lines to indicate that the broadcast DHCP messages are withheld from these links.

Withholding the broadcast DHCP messages from clients 110 and 114 is contrary to the typical behavior of the switch 106. The switch 106 would typically forward the broadcast DHCP messages to clients 110 and 114 because the destination address of the broadcast DHCP messages is the reserved broadcast address.

Withholding the broadcast DHCP messages is advantageous since it reduces the number of data packets sent to clients 110 and 114, making room for other data packets, and prevents clients 110 and 114 from knowing the network address accepted by client 112.

Switch 106 forwards the broadcast DHCP messages to switch 104. Switch 104 also receives a port description and configures its ports accordingly. Switch 104 identifies the server 102 and the client 112 as being two parties interested in communicating and configures its ports so that broadcast DHCP messages exchanged through switch 104 by the server 102 and client 112 are withheld from the uninterested entities connected to the switch 104, namely switch 108.

Physical link 306 is shown as a dashed line to indicate that the broadcast DHCP messages are withheld from the link. Since the broadcast DHCP messages are withheld from switch 108, they are also withheld from clients 116 and 118 which are connected to switch 108. Physical links 308 and 310 are shown as dashed lines to indicate that the broadcast DHCP messages are withheld from these links.

Figure 4:
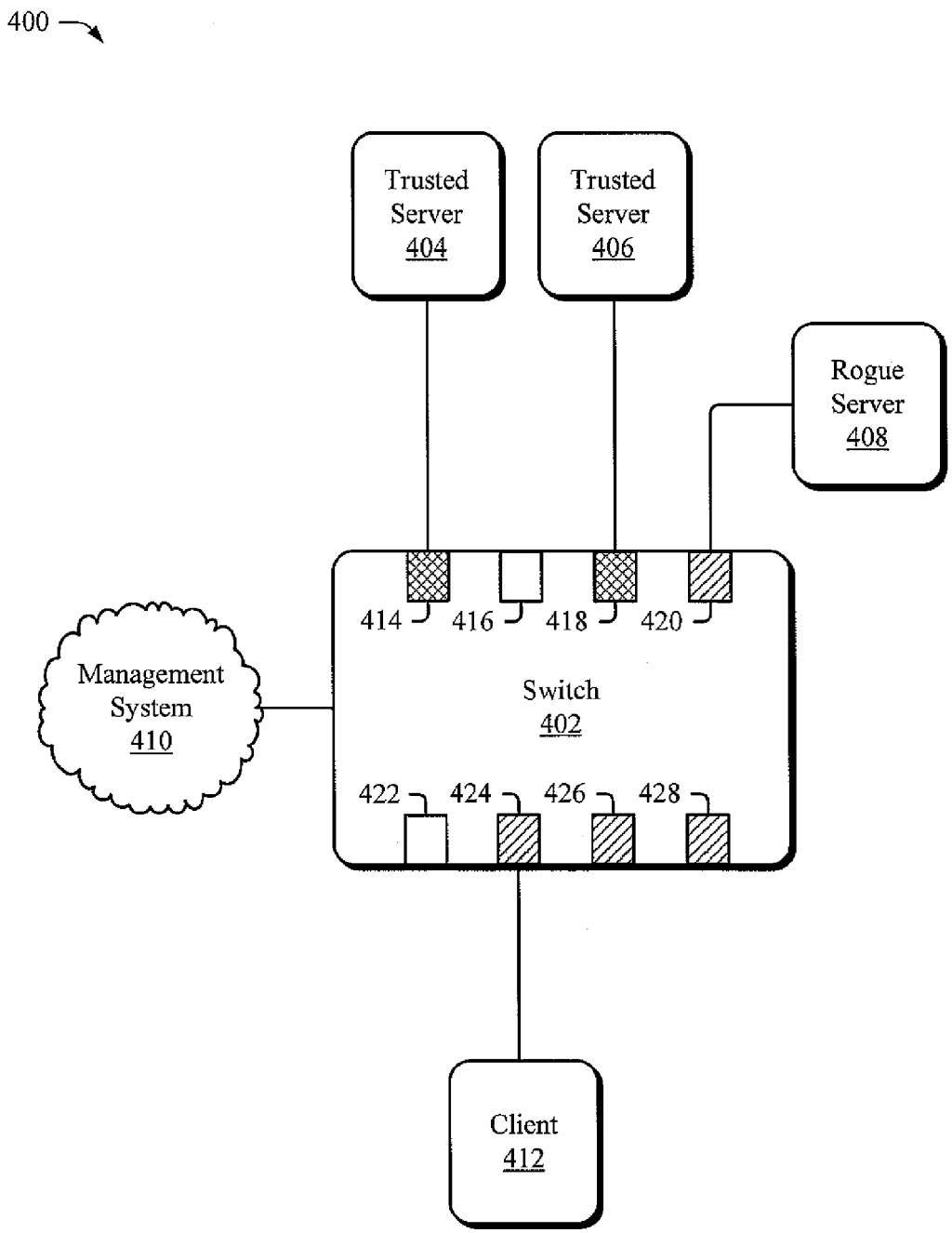
FIG. 4 illustrates an exemplary switch capable of withholding a data packet from a port despite its destination address in a first configuration.

FIG. 4 is a block diagram 400 illustrating an exemplary switch capable of withholding a data packet from a port despite its destination address. The block diagram 400 includes a switch 402 connected to two trusted servers 404, 406; a rogue server 408; a management system 410; and a client 412. The switch 402 comprises a plurality of ports 414, 416, 418, 420, 422, 424, 426, 428. Instances of switch 402 may be used as switch 104, 106, and 108 of FIGS. 1 and 3.

The trusted servers 404, 406, in one embodiment, are DHCP servers. The DHCP servers are trusted because they are legitimate servers controlled by a network operator. The rogue server 408 is also a DHCP server. The rogue server is not a trusted server because the network operator does not control it. In fact, the network operator may not know that the rogue server is connected to the switch. The client 412, in one embodiment, is a DHCP client that acquires a network address from one of the trusted servers using broadcast DHCP messages.

The management system 410 provides configuration communications to the switch that instruct the switch to configure itself in a particular way. For example, the management system may send the switch a configuration communication instructing it to configure ports 424 and 426 to be in the same domain. A network operator uses the management system to achieve a desired network configuration.

The management system may use a number of methods of providing the configuration communication to the switch such as a Simple Network Management Protocol (SNMP) message, a configuration file, a user-initiated configuration command, a Common Object Request Broker Architecture (CORBA) command, an Application Programming Interface (API) call, or other method of configuring a switch well known to those of skill in the art.

The ports of the switch are configured in an exemplary manner. Ports 414, 418, 420, 424, 426, and 428 belong to the same domain. These ports are shaded with diagonal lines sloping up and to the right to indicate that they belong to the domain. Ports 416 and 422 do not belong to the domain. Ports 426 and 428 may be connected to other network devices that are not illustrated.

Ports 416 and 422 may belong to a different domain. As discussed above in relation to FIG. 1, a switch may accommodate more than one domain simultaneously. For example, the switch may support VLANs as domains such that ports 414, 418, 420, 424, 426, and 428 belong to one VLAN and ports 416 and 422 belong to a different VLAN.

The management system has configured ports 414 and 418 as trusted server ports. These ports are additionally shaded with diagonal lines sloping up and to the left to indicate that they are trusted server ports. The two trusted server ports form a subset of the ports that belong to the domain. These ports have been configured as trusted server ports because they are connected to trusted servers.

The client 412, in an effort to obtain a network address, sends a broadcast DHCP message to the switch that is received on port 424. Due to the broadcast destination address of the broadcast DHCP message, the typical behavior of the switch would be to forward the broadcast DHCP message to ports 414, 418, 420, 426, and 428 since these ports belong to the same domain as port 424.

Instead of following typical behavior, the switch forwards the broadcast DHCP message to the trusted server ports 414, 418. Consequently, the two trusted servers will each receive the broadcast DHCP message and will be able to reply to the client.

The switch prevents the broadcast DHCP message from being forwarded on ports 420, 426, and 428 even though they are part of the same domain as port 424. This reduces the number of replicated broadcast DHCP messages and makes the network more secure since the broadcast DHCP messages are withheld from devices that do not need to receive them.

Withholding the broadcast DHCP message from the rogue server is especially advantageous. The rogue server may be configured to receive broadcast DHCP messages from clients that are intended for a legitimate, trusted DHCP server. If the rogue server receives a broadcast DHCP discover message, the rogue server may reply to the DHCP discover message with a DHCP offer message.

If the client replies to the rogue server's DHCP offer message with a DHCP request message, the rogue server will have successfully given an address to the client and will effectively control the client's address. Consequently, the rogue server may conduct various malicious activities such as sending spoof messages, reconfiguring the client, and preventing data packets associated with services to which the client subscribes from reaching their intended destinations. This sequence of events is avoided by withholding broadcast DHCP messages from non-trusted ports, thereby withholding broadcast DHCP messages from the rogue server.

Some ports of the switch belonging to the domain may be configured as trusted server ports by the management system. Alternatively, the switch may determine which ports are trusted server ports.

Figure 5:
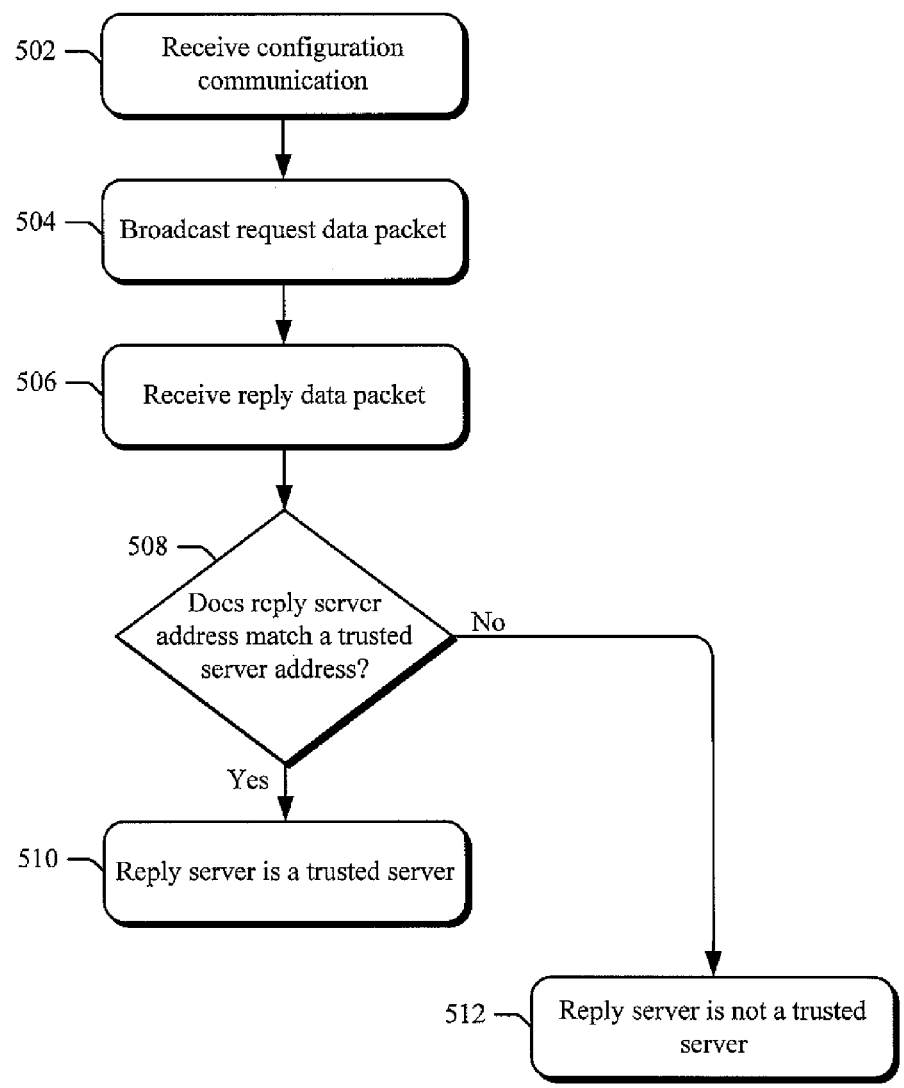
FIG. 5 illustrates an exemplary method of classifying a switch port as a trusted port.

FIG. 5 illustrates an exemplary method 500 that a switch may use to classify a switch port as a trusted server port. In this exemplary method, the switch receives a configuration communication 502 identifying a set of trusted devices. The configuration communication may be received from a management system through an SNMP message, configuration file, user command, CORBA command, API call, or other method of configuring a switch well known to those of skill in the art. The configuration communication may identify the trusted devices by name, by their network address, or using some other identifier that enables the switch to distinguish the trusted devices from each other.

Next, the switch broadcasts a request data packet 504. The switch broadcasts the request data packet so that the switch can determine which of the trusted devices are in the same domain as the switch and which of the switch's ports each trusted device is connected to (either directly or indirectly).

The request data packet requests a response from the trusted devices and may be addressed to a reserved broadcast destination address rather than being addressed to an individual trusted device. The use of the reserved broadcast destination address, as discussed above in relation to FIG. 1, effectively addresses the request data packet to all devices within the domain in which the request data packet is sent.

The request data packet includes a current identifier that identifies the particular switch that sends the request data packet. The switch uses the request identifier to distinguish request data packets that it sends from request data packets sent by other switches in the domain. In one embodiment, the current identifier is the Medium Access Control (MAC) Address of the switch. The MAC address is a unique number assigned to the switch that is readily identifiable by the switch and by other devices in the domain.

Those trusted servers that belong to the domain in which the request data packet is sent receive the request data packet. In response to receiving the request data packet, the trusted servers send a reply data packet. The trusted servers may send the reply data packet directly to the switch or alternatively may broadcast the reply data packet to all devices in the domain using a reserved broadcast address or other method of broadcasting.

The switch receives the reply data packets 506 by trusted servers in the domain. In addition, the switch may receive reply data packets from servers in the domain that are not trusted servers. Since the request data packet may have been sent to all devices in the domain, it may be received by both trusted servers and non-trusted servers that belong to the domain.

The switch determines 508 whether each reply data packet it receives was sent by a trusted server. In one embodiment, each reply data packet includes a source network address that identifies the server that sent the reply data packet. In addition, the configuration communication received by the switch in this embodiment identifies the trusted servers by their network addresses.

The switch compares the source network address of the reply data packet to the configuration communication. If the source network address is included in the configuration communication, the server that sent the reply data packet is a trusted server 510. If the source network address is not included in the configuration communication, the server that sent the reply data packet is not a trusted server 512.

Since a plurality of switches may exist within a domain, and each of these switches may be sending request data packets, the switch verifies that a reply data packet it receives was sent in response to a request data packet the switch sent. The switch uses a reply identifier, which is included in the reply data packet, in conjunction with the current identifier to verify that the reply data packet was sent in response to a request data packet sent by the switch.

In one embodiment, a server that responds to a request data packet uses the current identifier from the request data packet it received from the switch as its reply identifier. For example, if the current identifier is the MAC address of the switch, the server includes the MAC address of the switch (not the MAC address of the server) in the reply data packet as the reply identifier.

When the switch receives the reply data packet, it inspects the reply identifier. If the reply identifier matches the current identifier, the switch knows that the reply data packet was sent in response to a request data packet sent by the switch. If the reply identifier does not match the current identifier, the switch may ignore the reply data packet.

Of course, other schemes could be used to determine if a reply data packet is a response to a particular request data packet. For example, the current identifier could be a random number generated by the switch and the reply identifier could be a manipulated version of the random number, for example, the random number plus an offset value. Other schemes well known to those of skill in the art could also be used.

The switch keeps track of the port on which it receives each reply data packet. If the switch determines a reply data packet has been sent in response to a request data packet sent by the switch and that the server that sent the reply data packet is a trusted server, the switch marks the port on which the reply data packet was received as a trusted server port. The switch may mark the port as trusted by keeping a list of trusted server ports, setting a flag in a configuration file, or other method well known to those of skill in the art for identifying a port as a trusted server port.

In one embodiment, the method 500 may use DHCP messages to classify a switch port as a trusted server port. For example, the request data packet may comprise a DHCP discover message that is broadcast to all devices in the domain. In response to the DHCP discover message, one or more DHCP servers may send a reply data packet comprising a DHCP offer message.

The switch compares the DHCP offer message with the configuration communication and the current identifier to determine whether each DHCP server that responds with a DHCP offer message is a trusted server. The method then marks ports on which it receives DHCP offer messages from trusted servers as trusted server ports.

Figure 6:
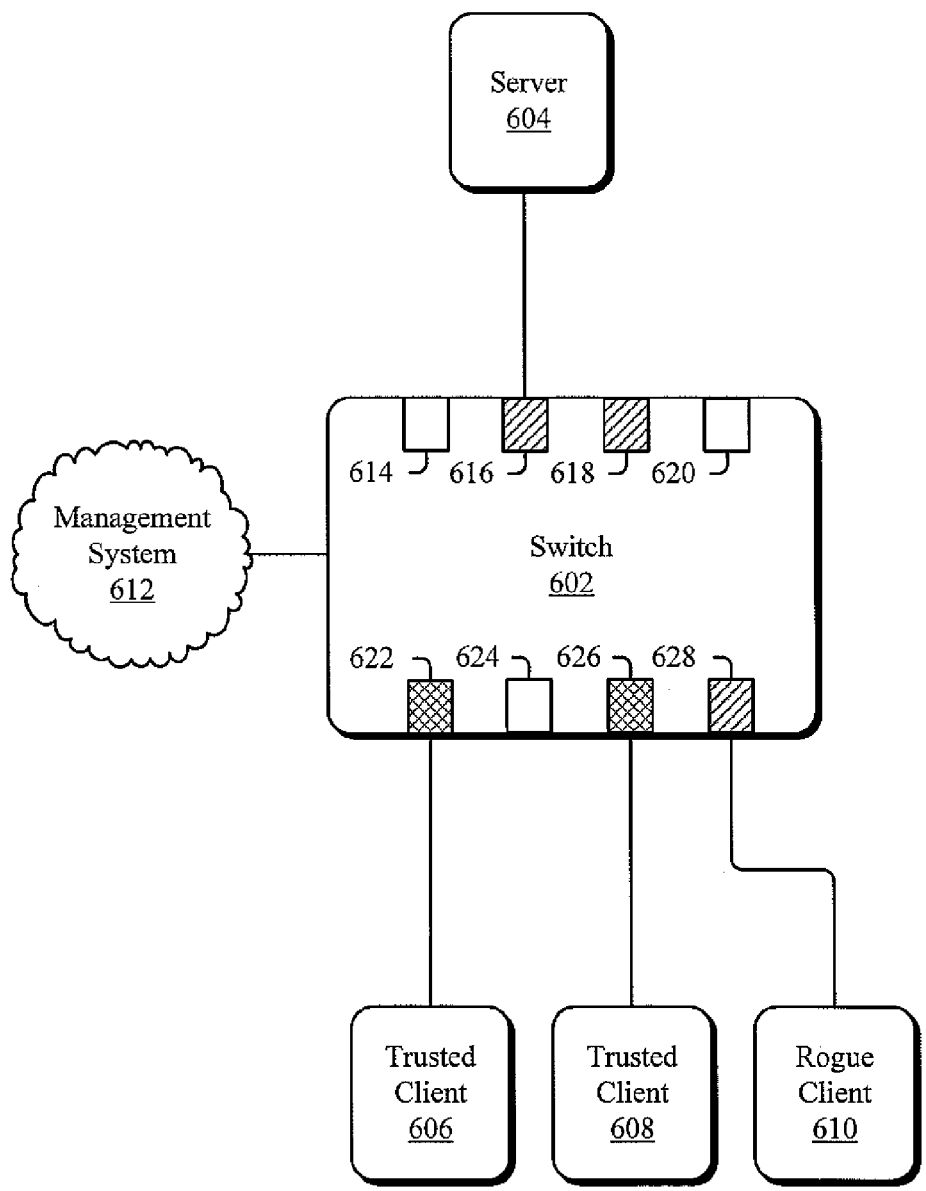
FIG. 6 illustrates an exemplary switch capable of withholding a data packet from a port despite its destination address in a second configuration.

FIG. 6 is a block diagram 600 illustrating an exemplary switch capable of withholding a data packet from a port despite its destination address. The block diagram 600 includes a switch 602 connected to a server 604; two trusted clients 606, 608; a rogue client 610; and a management system 612. The switch 602 comprises a plurality of ports 614, 616, 618, 620, 622, 624, 626, 628.

The server 604, in one embodiment, is a DHCP server that provides a network address to one of the trusted clients using broadcast DHCP messages. The trusted clients 606, 608 in one embodiment, are DHCP clients. The DHCP clients are trusted because they are legitimate clients that are known to and controlled by a network operator.

The rogue client 610 may also be a DHCP client. The rogue client is not a trusted client because it is not controlled by the network operator. In fact, the network operator may not know that the rogue client is connected to the switch.

The management system 612 provides a port description to the switch that instructs the switch to configure itself in a particular way. For example, the management system may send the switch a port description instructing it to configure ports 616 and 618 to be in the same domain. A network operator may create the port description and use the management system to achieve a desired network configuration.

The management system may use a number of methods of providing the port description such as a Simple Network Management Protocol (SNMP) message, a configuration file, a user-initiated configuration command, a Common Object Request Broker Architecture (CORBA) command, an Application Programming Interface (API) call, or other method of configuring a switch well known to those of skill in the art.

The ports of switch 602 are configured in an exemplary manner. Ports 616, 618, 622, 626, and 628 belong to the same domain. These ports are shaded with diagonal lines sloping up and to the right to indicate that they belong to the domain. Ports 614, 620, and 624 do not belong to the domain. These ports may belong to a different domain. Port 618 may be connected to a network device that is not illustrated.

The management system has configured ports 622 and 626 as trusted client ports. These ports are additionally shaded with diagonal lines sloping up and to the left to indicate that they are trusted client ports. The two trusted client ports form a subset of the ports that belong to the domain. These ports have been configured as trusted client ports because they are connected to trusted clients.

Trusted client 606, in an effort to obtain a network address, sends a broadcast DHCP message to the switch that is received on port 622. Before forwarding the broadcast DHCP message to the switch ports that belong to the same domain as port 622, the switch determines whether the broadcast DHCP message was received on a trusted client port. The switch consults the port description and determines that port 622 is a trusted client port. Since port 622 is a trusted client port, the switch forwards the broadcast DHCP message to the other ports in the domain 616, 618, 626, and 628.

The rogue client 610, in an effort to obtain a network address, may also send a broadcast DHCP message to the switch. This message is received on port 628. Before forwarding the broadcast DHCP message to the switch ports that belong to the same domain as port 628, the switch determines whether the broadcast DHCP message was received on a trusted client port.

The switch consults the port description and determines that port 628 is not a trusted client port. Since port 628 is a not trusted client port, the switch does not forward the broadcast DHCP message to the other ports in the domain 616, 618, 626, and 628.

Withholding the broadcast DHCP message received from the rogue client may prevent unauthorized use of the network. Since the broadcast DHCP message received from the rogue client is not forwarded to the server, the rogue client may be unable to obtain a network address and consequently will be unable to use the network.

Withholding the broadcast DHCP message received from the rogue server may also protect the server from attacks. For example, if the rogue server was allowed to obtain an address from the server, it could repeatedly request additional addresses until the server had given out all of its addresses, thereby preventing trusted clients from obtaining an address.

The use of trusted client ports and trusted server ports (described above in relation to FIG. 4) may be combined within a single switch. In such an embodiment, a switch may receive a broadcast DHCP message from trusted client 606 on port 622. The switch determines that port 622 is a trusted client port based on the port description. The switch then determines which of the other ports in the domain (ports 616, 618, 626, and 628) are trusted server ports based on a configuration communication as described above in relation to FIG. 4 or based on the method described above in relation to FIG. 5.

The switch then forwards the broadcast DHCP message to those ports that belong to the domain and are trusted server ports. For example, if port 616 was a trusted server port, the switch would forward the broadcast DHCP message to port 616 and consequently the server 604 would receive the broadcast DHCP message.

Figure 7:
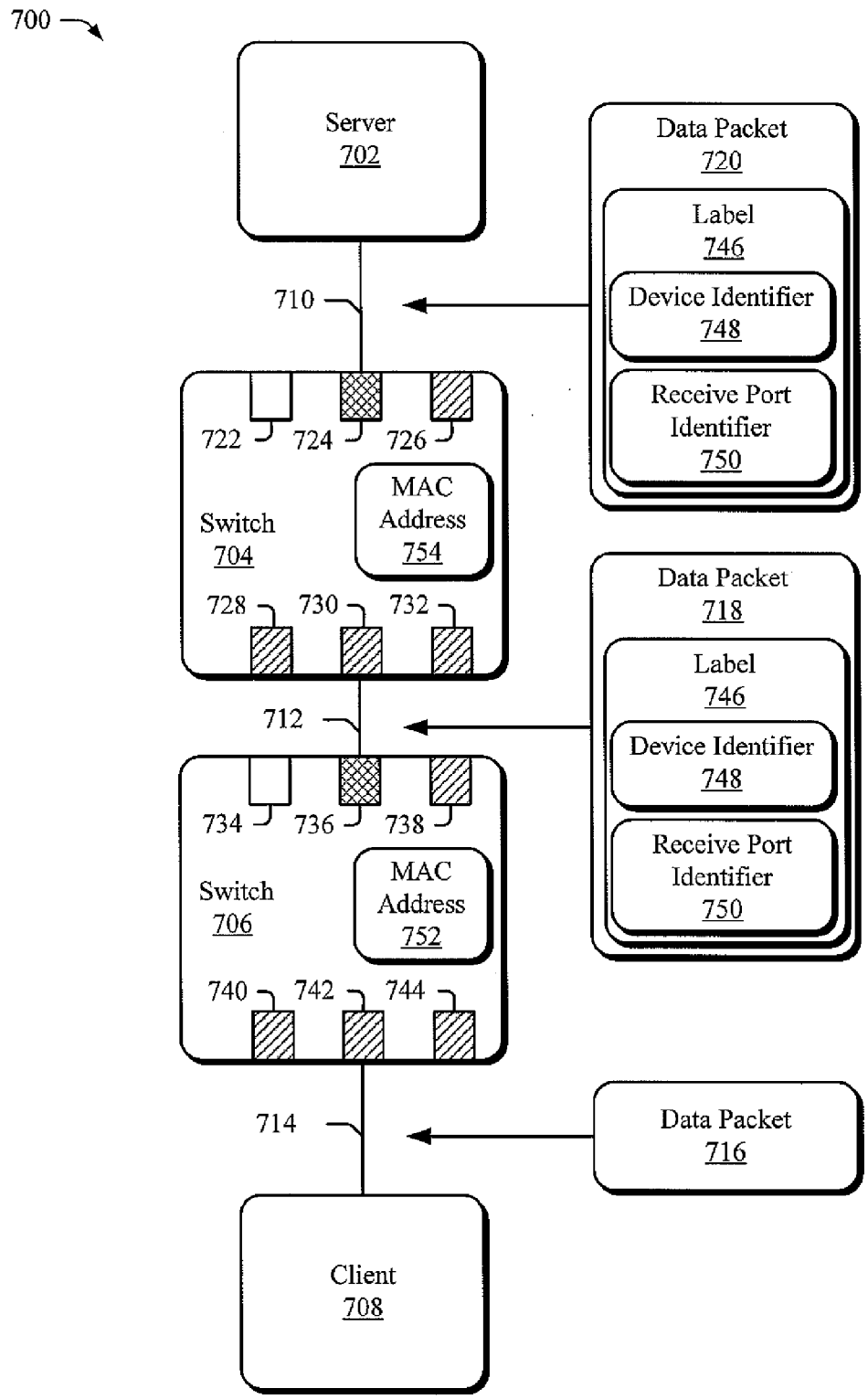
FIG. 7 illustrates a system of switches capable of withholding a data packet from a port despite its destination address along with exemplary data packets relayed from a client to a server.

FIG. 7 illustrates a system 700 of switches capable of withholding a data packet from a port despite its destination address along with exemplary data packets relayed from a client to a server. The system enables a method used by two switches to relay a broadcast data packet from a client to a server. The system includes a server 702; two switches 704, 706; a client 708; and three physical links 710, 712, 714. In addition, three exemplary data packets 716, 718, 720 are illustrated.

The server and client communicate with each other by exchanging data packets. The switches couple the server to the client through a domain and relay data packets between the server and client. At least a portion of the data packets exchanged by the client and server are broadcast data packets that use a reserved address. The reserved address prompts the switches forward the broadcast data packets to other devices belonging to the domain.

Switch 704 includes six ports 722, 724, 726, 728, 730, 732 configured in an exemplary manner. Ports 724, 726, 728, 730, and 732 belong to a common domain. These ports are shaded with diagonal lines sloping up and to the right to indicate that they belong to the domain. Port 722 does not belong to the domain. Port 724 is a trusted server port in accordance with the trusted server port described above in relation to FIG. 4. Ports 722, 726, 728, and 732 may be connected to other network devices not illustrated in FIG. 7.

Switch 706 also includes six ports 734, 736, 738, 740, 742, 744 configured in an exemplary manner. Ports 736, 738, 740, 742, and 744 belong to the same domain as ports 724, 726, 728, 730, and 732. These ports are shaded with diagonal lines sloping up and to the right to indicate that they belong to the domain. Port 734 does not belong to the domain. Port 736 is a trusted server port. Ports 734, 738, 740, and 744 may be connected to other network devices not illustrated in FIG. 7.

The client 708 sends a broadcast data packet to switch 706 on link 714. Switch 706 receives the broadcast data packet on port 742. Exemplary data packet 716 represents this broadcast data packet.

After receiving the broadcast data packet, switch 706, in one embodiment, examines the broadcast data packet to determine if it has been marked with a label. The label aids the switch in identifying a port to which a subsequent response from the server to the broadcast data packet is to be forwarded. A method of using the label to accomplish this objective is discussed below in relation to FIG. 8.

Since switch 706 receives the broadcast data packet directly from the client, it has not yet been marked with a label. Accordingly, switch 706 marks the broadcast data packet with a label. The label identifies the switch that received the data packet as well as the switch port on which the broadcast data packet was received (port 742 in the exemplary embodiment of FIG. 8). Exemplary data packet 718 represents the marked broadcast data packet.

Switch 706 may add the label to the broadcast data packet without displacing the content of the original broadcast data packet. The label 746 comprises a device identifier 748 and a receive port identifier 750. The device identifier 748 uniquely identifies switch 706 as the entity that added the label to the broadcast data packet. The device identifier may be a MAC address 752 assigned to switch 706 or another identifier that uniquely identifies switch 706.

The receive port identifier 750 identifies the port on which the broadcast data packet was received by switch 706. The receive port identifier may be a port number, port name, or other identifier that uniquely identifies the port on which the broadcast data packet was received.

As described above in relation to FIG. 4, due to the broadcast destination address of the broadcast DHCP message, the typical behavior of the switch would be to forward the broadcast DHCP message to ports 736, 738, 740, and 744 since these ports belong to the same domain as port 742.

Instead of following this typical approach, the switch forwards the broadcast DHCP message to the trusted server port 736 in accordance with the method described above in relation to FIG. 4. Consequently, the broadcast DHCP message is sent via link 712 to switch 704. Switch 704 receives the broadcast DHCP message on port 730.

After receiving the broadcast data packet, switch 704 examines the broadcast data packet to determine if it has been marked with a label. In one embodiment, switch 704 recognizes the label that switch 706 added to the broadcast data packet and consequently does not mark the data packet with its own label.

In another embodiment, switch 706 adds a second label to the broadcast data packet. The second label may include a device identifier and receive port identifier. The second label differs from the first label in that the device identifier of the second label identifies switch 704 rather than switch 706. For example, if the device identifier comprises a MAC address, the device identifier for the second label is the MAC address 754 for switch 704 and the device identifier for the first label is the MAC address 752 for switch 706.

Switch 704 then forwards the broadcast data packet to port 724 since port 724 is the only trusted server port in the domain. Consequently, the broadcast data packet is relayed by link 710 to the server. Exemplary data packet 720 illustrates the format of the broadcast data packet on link 710 for an embodiment of switch 704 that does not add a second label to the broadcast data packet.

In one embodiment, the server is a DHCP server, the client is a DHCP client, and the broadcast data packet is a DHCP discover message or DHCP request message. In this embodiment, the label may be a relay agent information option field described by Request For Comments (RFC) 3046 published by the Internet Engineering Task Force.

Figure 8:
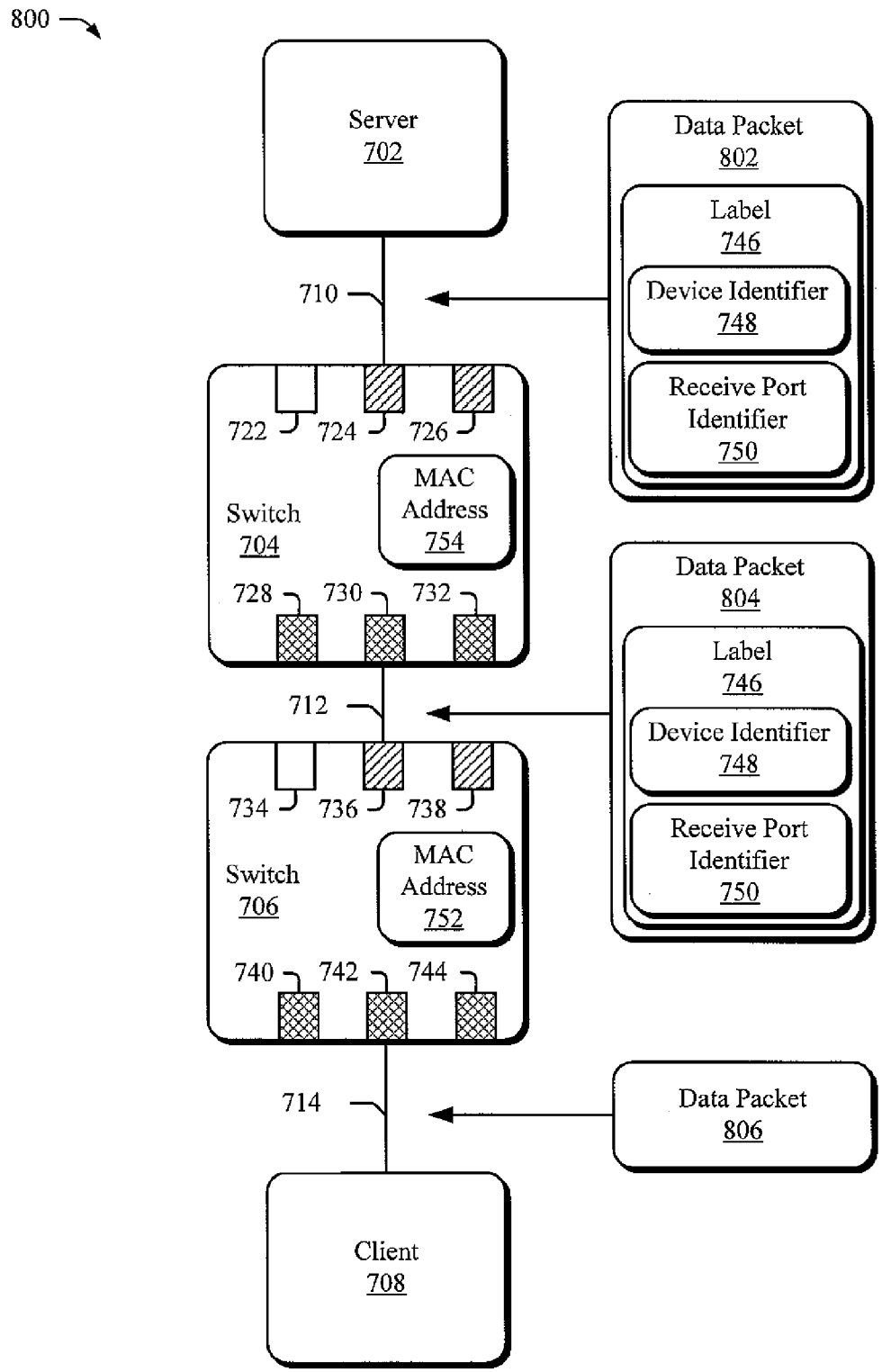
FIG. 8 illustrates a system of switches capable of withholding a data packet from a port despite its destination address along with exemplary data packets relayed from a server to a client.

FIG. 8 illustrates a system 800 similar to system 700 of FIG. 7. The ports of FIG. 8 differ slightly from the ports of FIG. 7 in two aspects. First, ports 724 and 736 are no longer trusted server ports. Second, ports 728, 730, 732, 740, 742, and 744 are trusted client ports similar to the trusted client port described above in relation to FIG. 6. The system 800 enables the switches to relay a response to the broadcast data packet of FIG. 7 from the server to the client. The system 800 also illustrates three exemplary data packets 802, 804, 806.

Once the server 702 receives the broadcast data packet from Switch 704 via link 710 (described above in relation to FIG. 7), the server responds to the broadcast data packet with a response packet, which is also a broadcast data packet. The server includes the label from the broadcast data packet in the response packet. The server sends the response packet to switch 704 on link 710. Exemplary data packet 802 illustrates the format of the response packet on link 710.

After receiving the response packet on port 724, switch 704 examines the response packet label to determine if the device identifier 748 matches a current identifier for switch 704. As described above in relation to FIG. 7, the current identifier may be the MAC address 754 for switch 704. In this case, the device identifier has a value equal to the current identifier of switch 706, not switch 704 since the server used the label from the broadcast data packet sent by the client in the response packet. Consequently, the device identifier 748 of the response packet and current identifier for switch 704 do not match.

As a result, switch 704 forwards the response packet to its ports identified as trusted client ports in a manner in accordance with that described above in relation to FIG. 6. In this manner, the number of broadcast data packets forwarded by switch 704 is reduced since switch 704 sends the response packet to trusted client ports (a subset of the ports belonging to the domain) instead of forwarding the response packet to all ports in the domain as a typical switch would.

If the device identifier of another exemplary response packet and the current identifier for switch 706 match, switch 706 forwards the response packet to the port identified by the receive port identifier 750 portion of the label and does not forward the response packet to other ports in the domain, whether they are trusted client ports or not.

Since the current identifier for switch 704 and the device identifier 748 of exemplary data packet 802 do not match, switch 706 receives the response packet on port 736 via link 712. Exemplary data packet 804 illustrates the format of the response packet on link 712. The label format for exemplary data packets 802 and 804 are substantially similar.

After receiving the response packet on port 736, switch 706 examines the response packet label to determine if the device identifier matches a current identifier for switch 706. As described above in relation to FIG. 7, the current identifier may be the MAC address 752 for switch 706. In this case, the device identifier has a value equal to the current identifier of switch 706. Consequently, the device identifier and current identifier for switch 706 match.

In one embodiment, switch 706 removes the label from the response packet before forwarding the response packet. In another embodiment, switch 706 leaves the label in the response packet. Switch 706 forwards the response packet to the port specified by the receive port identifier 750 portion of the label, in this case port 742. Switch 706 does not forward the response packet to other ports in the domain, whether they are trusted client ports or not. In this manner, the number of broadcast data packet forwarded by switch 706 is reduced since switch 706 sends the response packet directly to the client instead of forwarding the response packet to all ports in the domain as a typical switch would.

The client receives the response packet via link 714. Exemplary data packet 806 illustrates the format of the response packet on link 712 for an embodiment of switch 706 that removes the label from the response packet.

In one embodiment, the server is a DHCP server, the client is a DHCP client, and the response packet is a DHCP offer message. In this embodiment, the label may be a relay agent information option field described by RFC 3046:

Other Embodiments of the Tools

Figure 9:
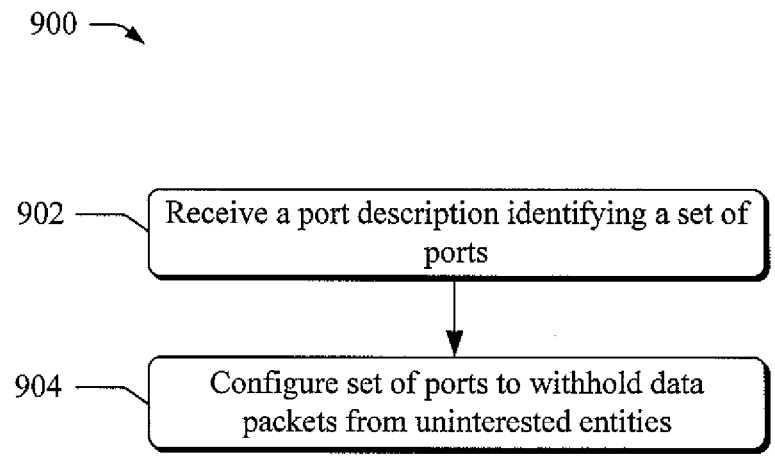
FIG. 9 is an exemplary process illustrating various embodiments and manners in which the tools configure a set of ports to withhold data packets from uninterested entities.

The section above describes exemplary ways in which the tools withhold a data packet from a switch port despite its destination address. The section below describes additional embodiments of the tools, including processes. Each of the processes below may be performed by a switch through computer-executable instructions on computer-readable media, hardware, a combination of both, or otherwise. FIG. 9 illustrates a process 900 as a series of blocks representing individual operations or acts performed by the tools.

At block 902, the tools receive a port description identifying a set of ports of a data-packet switch associated with a domain. As described above in relation to FIG. 1, the domain may be a LAN, ULAN, multicast group, or other construct that enables a device in one domain to exchange data packets with other devices in the domain but prevents the device from exchanging data packets with devices in a different domain.

As described above in relation to FIG. 1, the tools may receive the port description from a management system through a configuration file, a set of SNMP messages, or through another configuration tool well known to those of skill in the art. Alternatively, the port description may be received as part of a firmware or software package executed by the tools. The port description could also be received through multicast join and/or leave messages.

At block 904, the tools configure the set of ports, based on the port description, so that broadcast data packets exchanged through the data-packet switch by two interested entities that would otherwise be forwarded to uninterested entities in the domain are instead withheld from the uninterested entities. The broadcast data packets would otherwise be forwarded to uninterested entities due to a broadcast destination address included in the broadcast data packets.

As described above in relation to FIG. 1, the broadcast data packets may be Ethernet data packets that use a reserved broadcast address as a destination address. Alternatively, the broadcast data packets may use a different construct to request that the tools forward the broadcast data packet to the other devices belonging to the domain.

Figure 10:
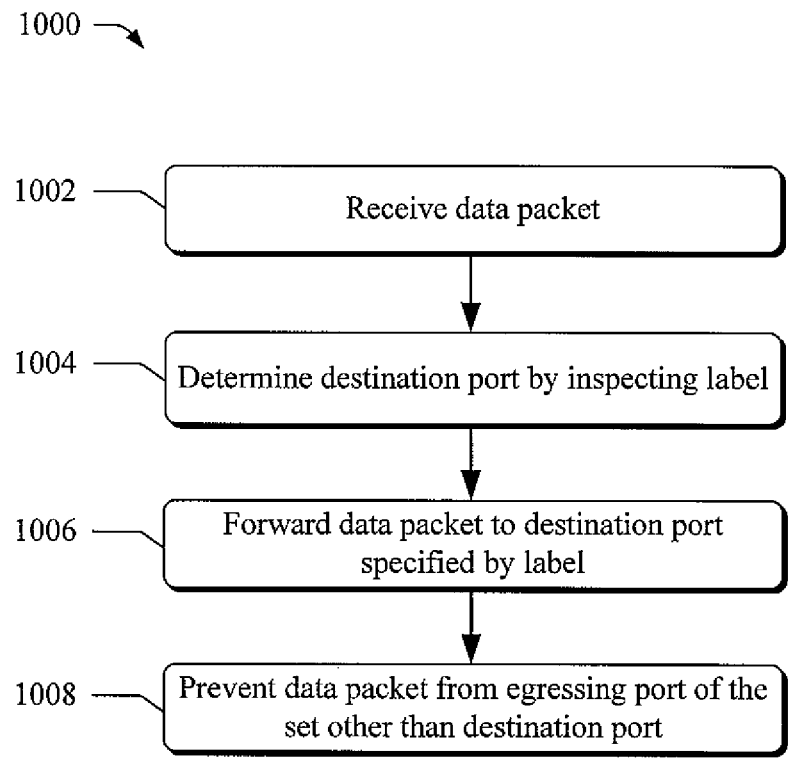
FIG. 10 is an exemplary process illustrating various embodiments and manners in which the tools forward a data packet to a destination port specified by a label.

FIG. 10 illustrates another embodiment of the tools as method 1000, which is illustrated as a series of blocks representing individual operations or acts performed by the tools. At block 1002, the tools receive a data packet on a receive port associated with a domain from a data device. The data packet includes a destination address specifying that the data packet be forwarded to each of a set of ports, each port of the set being associated with the domain. As described above in relation to FIG. 1, the data device may be a server or a client. In addition, the data device may be a device capable of transmitting and receiving data packets.

As described above in relation to FIG. 1, in one embodiment, the destination address may be a reserved Ethernet broadcast address. The destination address may also be a multicast address. As described above in relation to FIG. 1, the domain may be a LAN, VLAN, multicast group, or other construct that enables a device in one domain to exchange data packets with other devices in the domain but prevents the device from exchanging data packets with devices in a different domain.

At block 1004, the tools determine a destination port for the data packet by inspecting a label of the data packet, the destination port belonging to the set of ports. The destination port may be a physical port or the destination may be a logical port comprising a plurality of physical ports as in an Ethernet link aggregation group.

In one embodiment, the label includes the device identifier and a receive port identifier described above in relation to FIGS. 7 and 8. The label may also utilize a relay information option field defined by RFC 3046.

At block 1006, the tools forward the data packet to the destination port specified by the label as described above in relation to FIG. 8.

At block 1008, the tools prevent the data packet from egressing a port of the set other than the destination port. The tools may prevent the data packet from egressing the port by not forwarding the data packet to the port or may prevent the data packet from egressing the port by forwarding the data packet to the port and then discarding the data packet at the port before it is transmitted by the port. Of course, other methods well known to those of skill in the art may also be used to prevent the data packet from egressing the port.

Figure 11:
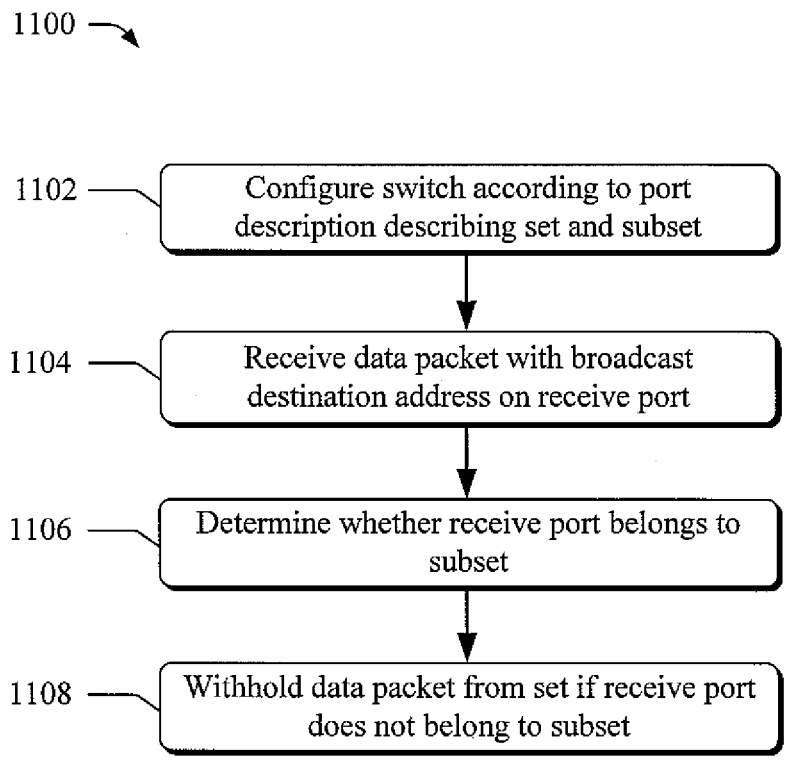
FIG. 11 is an exemplary process illustrating various embodiments and manners in which the tools withhold a data packet from a set of ports because a receive port does not belong to a subset of the set of ports.

FIG. 11 illustrates another embodiment of the tools as method 1100, which is illustrated as a series of blocks representing individual operations or acts performed by the tools. At block 1102, the tools configure a data-packet switch according to a port description. The port description identifies a set of ports of the data-packet switch associated with a domain and identifies a subset of the set of ports.

As described above in relation to FIG. 1, the domain may be a LAN, ULAN, multicast group, or other construct that enables a device in one domain to exchange data packets with other devices in the domain but prevents the device from exchanging data packets with devices in a different domain. The subset of ports may be the set of trusted client ports discussed above in relation to FIG. 6.

As described above in relation to FIG. 1 the tools may receive the port description from a management system through a configuration file, a set of SNMP messages, or through another configuration tool well known to those of skill in the art. Alternatively, the port description may be received as part of a firmware or software package executed by the tools. The port description could also be received through multicast join and/or leave messages.

At block 1104, the tools receive a data packet comprising a broadcast destination address on a receive port. The receive port is a member of the set of ports. As described above in relation to FIG. 1, the broadcast destination address may be a reserved broadcast address such as an Ethernet broadcast address. Alternatively, the broadcast data packets may use a different construct for the broadcast destination address that requests that the tools forward the broadcast data packet to the other devices belonging to the domain.

At block 1106, the tools determine, based on the port description, whether the receive port belongs to the subset. As discussed above in relation to FIG. 6, the tools may do this by comparing a receive port identifier to the port description.

At block 1108, the tools withhold the data packet from the other ports in the set if the receive port does not belong to the subset. The data packet is withheld despite a request implicit in the broadcast destination address that the data packet be forwarded to all the ports of the set except the receive port.

The tools may withhold the data packet from the other ports in the set by not forwarding the data packet to the other ports or may withhold the data packet by forwarding the data packet to the other ports and discarding the data packet at the other ports before it is transmitted by the other port. Of course, other methods well known to those of skill in the art may also be used to withhold the data packet from the other ports in the set.

Figure 12:
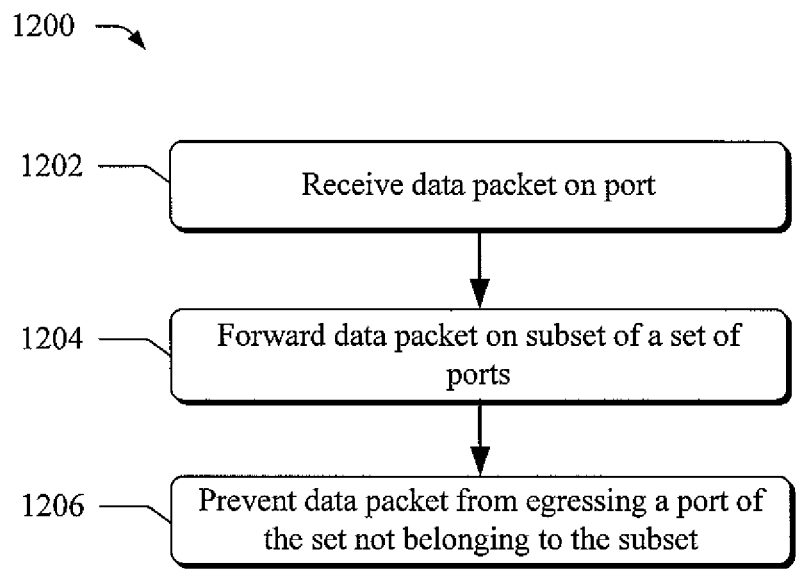
FIG. 12 is an exemplary process illustrating various embodiments and manners in which the tools prevent a data packet from egressing a port of a set of ports that does not belong to a subset of the ports.

FIG. 12 illustrates another embodiment of the tools as method 1200, which is illustrated as a series of blocks representing individual operations or acts performed by the tools. At block 1202, the tools receive a data packet on a receive port from a data device. The receive port is associated with a domain. The data packet comprises a destination address specifying that the data packet be forwarded to each of a set of ports, each port of the set being associated with the domain.

As described above in relation to FIG. 1, the domain may be a LAN, ULAN, multicast group, or other construct that enables a device in one domain to exchange data packets with other devices in the domain but prevents the device from exchanging data packets with devices in a different domain.

As described above in relation to FIG. 1, the destination address may be a reserved broadcast address such as an Ethernet broadcast address. Alternatively, the broadcast data packets may be a multicast address.

As described above in relation to FIG. 1, the data device may be a server or a client. In addition, the data device may be a device capable of transmitting and receiving data packets.

At block 1204, the tools forward the data packet from the receive port to each of a subset of the set of ports. Each of the ports of the subset is a trusted port. The subset of trusted ports may be trusted server ports as discussed above in relation to FIG. 4. At block 1206, the tools prevent the data packet from egressing a port of the set that is not part of the subset.

Figure 13:
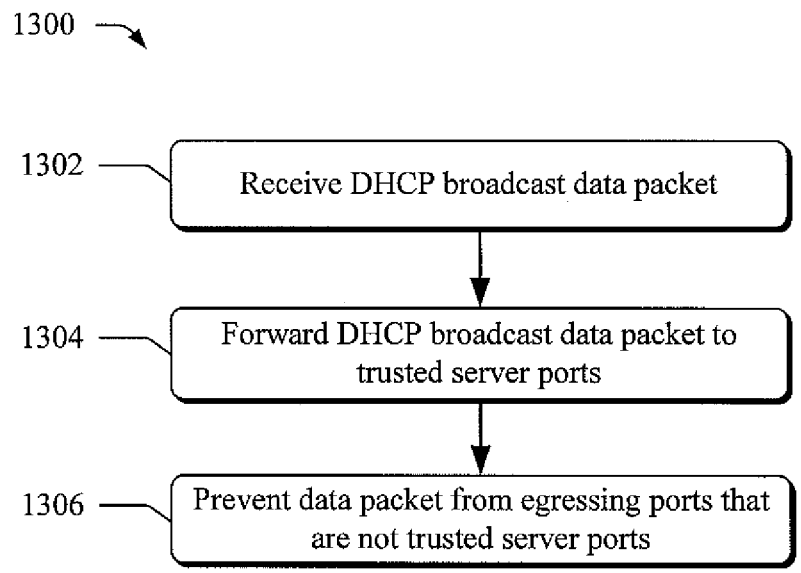
FIG. 13 is an exemplary process illustrating various embodiments and manners in which the tools forward a Dynamic Host Configuration Protocol (DHCP) broadcast data packet to trusted server ports.

FIG. 13 illustrates another embodiment of the tools as method 1300, which is illustrated as a series of blocks representing individual operations or acts performed by the tools.

At block 1302, the tools receive a Dynamic Host Configuration Protocol (DHCP) broadcast data packet on a receive port from a DHCP client. The receive port is associated with a domain and the DHCP broadcast data packet includes a broadcast destination address specifying that the DHCP broadcast data packet be forwarded to each of a set of ports. Each port of the set is associated with the domain.

As discussed above in relation to FIG. 1, the DHCP broadcast data packet may be a DHCP discover message or a DHCP request message. As described above in relation to FIG. 1, the destination address may be a reserved broadcast address such as an Ethernet broadcast address.

As described above in relation to FIG. 1, the domain may be a LAN, VLAN, multicast group, or other construct that enables a device in one domain to exchange data packets with other devices in the domain but prevents the device from exchanging data packets with devices in a different domain.

At block 1304, the tools forward the DHCP broadcast data packet from the receive port to each of a subset of the set of ports. Each of the ports of the subset is a trusted server port coupled to at least one trusted DHCP server. As discussed above in relation to FIG. 1, the trusted server port may be connected directly to a trusted DHCP server. Alternatively, the trusted server port may be connected indirectly to a trusted server through one or more other network devices as long as data packets can be relayed between the trusted server port and the trusted DHCP server.

At block 1306, the tools preventing the data packet from egressing any port of the set that is not part of the subset.

Figure 14:
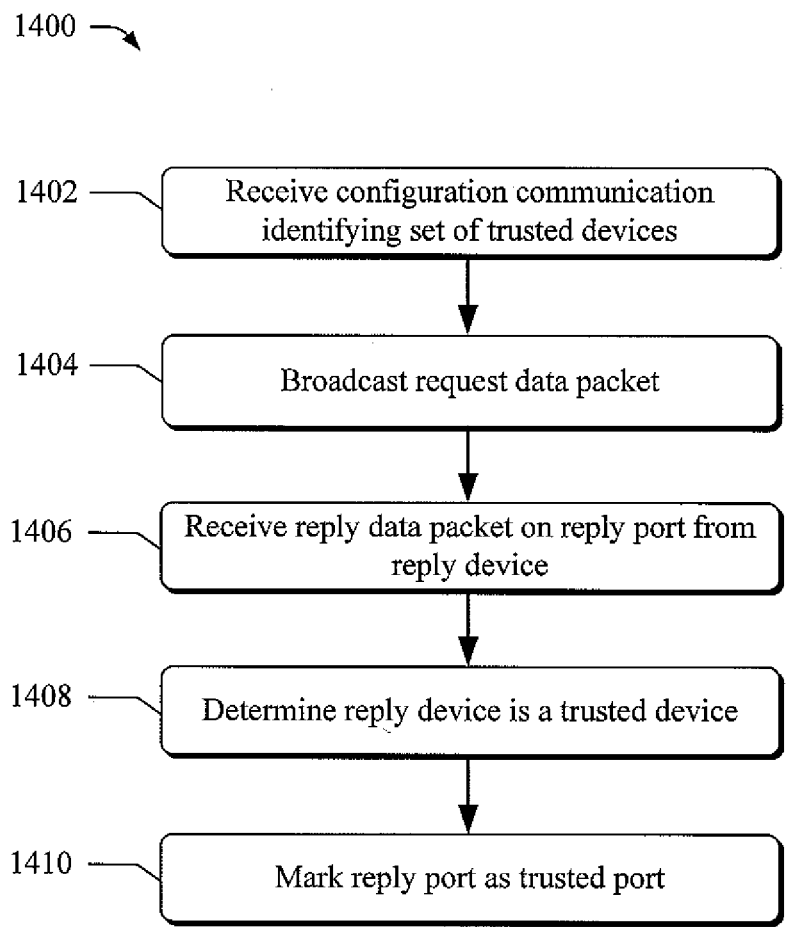
FIG. 14 is an exemplary process illustrating various embodiments and manners in which the tools determine that a reply device is a trusted device and mark a reply port as a trusted port.

FIG. 14 illustrates another embodiment of the tools as method 1400, which is illustrated as a series of blocks representing individual operations or acts performed by the tools.

At block 1402, the tools receive a configuration communication identifying a set of trusted devices. As described above in relation to FIG. 5, the configuration communication may be received from a management system through an SNMP message, configuration file, user command, CORBA command, API call, or other method of configuring a switch well known to those of skill in the art. The trusted devices may be trusted DHCP servers known to the network operator.

At block 1404, the tools broadcast a request data packet requesting a response from one or more of the trusted devices identified by the configuration communication. As discussed above in relation to FIG. 5, the request data packet may be a DHCP request message.

At block 1406, the tools receive a reply data packet in response to the request data packet on a reply port from a reply device. As discussed above in relation to FIG. 5, the request data packet may be a DHCP offer message.

At block 1408, the tools determine that the reply device is one of the trusted devices identified by the configuration communication. As discussed above in relation to FIG. 5, the tools may compare a network address from the reply data packet to the configuration communication in determining if the reply device is one of the trusted devices.

At block 1410, the tools mark the reply port as a trusted port. As discussed above in relation to FIG. 5, the tools may mark the port as trusted by keeping a list of trusted server ports, setting a flag in a configuration file, or other method well known to those of skill in the art for identifying a port as a trusted server port.

CONCLUSION

The above-described tools enable data-packet switches to withhold a data packet from a switch port despite its destination address. By so doing, the tools may reduce the number of data packets that are unnecessarily forwarded within a network. Although the tools have been described in language specific to structural features and/or methodological acts, it is to be understood that the tools defined in the appended claims are not necessarily limited to the specific features or acts described. Rather, the specific features and acts are disclosed as exemplary forms of implementing the tools.

The invention claimed is:

1. A method implemented at least in part by a computing device comprising:
   receiving a port description identifying a set of ports of a data-packet switch associated with a domain comprising the set of ports, wherein the domain is a local area network, virtual local area network, or a multicast group; and
   configuring the set of ports, based on the port description, to withhold from uninterested entities in the domain, via ports classified as untrusted through a server identification process, broadcast Dynamic Host Configuration Protocol (DHCP) data packets exchanged through the data-packet switch by interested entities within the domain that would otherwise be forwarded to the uninterested entities through the data-packet switch due to broadcast destination addresses associated with the broadcast DHCP data packets, wherein the uninterested entities are configured to communicate through the set of ports to one another and to the interested entities, and wherein the configuring only withholds the broadcast DHCP data packets from the uninterested entities;
   wherein the uninterested entities are uninterested due to being coupled to the untrusted ports;
   wherein, when the domain is the multicast group, the broadcast DHCP data packets are withheld from the uninterested entities despite a destination address in the broadcast DHCP data packets indicating delivery to the uninterested entities thereby preventing the uninterested entities from obtaining network address information through the broadcast DHCP data packets and thereby altering functionality of the broadcast DHCP data packets.

2. The method of claim 1, wherein one of the two interested entities is coupled to a first port belonging to the set of ports and the other interested entity is coupled to a second port belonging to the set of ports.

3. The method of claim 1, wherein one of the interested entities is coupled to one of a subset of the set of ports and each of the uninterested entities is coupled to one of the ports of the set that does not belong to the subset.

4. The method of claim 1, wherein the broadcast DHCP data packets, which would normally have broadcast destination addresses that would cause them to be broadcast to all ports associated with the domain, are restricted to only trusted ports associated with the domain in both directions between transmit ports and receive ports thereby reducing a number of data packets sent in the domain and preventing the uninterested entities from participating in broadcast DHCP.

5. A method for reducing a number of ports to which a data packet is forwarded comprising:
   receiving a Dynamic Host Configuration Protocol (DHCP) data packet on a receive port associated with a domain from a data device, the DHCP data packet comprising a destination address specifying that the DHCP data packet be forwarded to each of a set of ports, each port of the set of ports being associated with the domain, wherein the domain comprises the set of ports, wherein the domain is a local area network, virtual local area network, or a multicast group;
   determining a destination port for the DHCP data packet by inspecting a label of the DHCP data packet, the destination port belonging to the set of ports;
   forwarding the DHCP data packet to the destination port specified by the label;
   preventing the DHCP data packet from egressing a port of the set other than the destination port thereby reducing a number of data packets sent in the domain and preventing uninterested entities within the domain from participating in DHCP;
   receiving a non-DHCP data packet on the receive port; and
   forwarding the non-DHCP data packet based on addressing associated therewith;
   wherein the DHCP data packet comprises one of a discovery message, an offer message, and a request message that is typically delivered to all ports of the set of ports;
   wherein, when the domain is the multicast group, the DHCP data packet is a broadcast DHCP data packet, and wherein the broadcast DHCP data packet is withheld from the uninterested entities within the domain despite a destination address in the broadcast DHCP data packet indicating delivery to the uninterested entities within the domain thereby preventing the uninterested entities within the domain from obtaining network address information through the broadcast DHCP data packet and thereby altering functionality of the broadcast DHCP data packet.

6. The method of claim 5, wherein the label comprise a device identifier and a destination port identifier.

7. The method of claim 6, wherein the DHCP data packet comprises a DHCP offer message and the label comprises a relay agent information option field defined by Request For Comments (RFC) 3046.

8. The method of claim 6, wherein the device identifier comprises an Ethernet Media Access Control (MAC) address associated with an entity that added the label to the DHCP data packet.

9. The method of claim 6, wherein determining further comprises comparing the device identifier to a current identifier and determining that the device identifier has a predetermined relationship to the current identifier.

10. The method of claim 9, wherein the current identifier comprises a MAC address and the predetermined relationship comprises the device identifier matching the current identifier.

11. The method of claim 5, wherein the DHCP data packet comprises a DHCP offer message.

12. The method of claim 1, further comprising:
   receiving a broadcast DHCP data packet on one of the set of ports; and
   utilizing the configuration to withhold the broadcast DHCP data packet thereby reducing data traffic related to the broadcast DHCP data packet and preventing the uninterested entities from participating therein.

13. The method of claim 12, further comprising:
   receiving a non-broadcast DHCP data packet on one of the set of ports; and
   forwarding the non-broadcast DHCP data packet to any of the uninterested entities or the interested entities based on addressing associated with the non-broadcast DHCP data packet.

* * * * *